(12) United States Patent
Halley

(10) Patent No.: US 9,089,728 B2
(45) Date of Patent: Jul. 28, 2015

(54) TRUCK MOUNTED FIREFIGHTING PLATFORM ASSEMBLY

(71) Applicant: Ricky Lee Halley, Kingston, OH (US)

(72) Inventor: Ricky Lee Halley, Kingston, OH (US)

( * ) Notice: Subject to any disclaimer, the term of this patent is extended or adjusted under 35 U.S.C. 154(b) by 108 days.

(21) Appl. No.: 13/855,517

(22) Filed: Apr. 2, 2013

(65) Prior Publication Data
US 2014/0291371 A1 Oct. 2, 2014

(51) Int. Cl.
*A62C 27/00* (2006.01)
*A62C 33/04* (2006.01)
*B60R 9/06* (2006.01)

(52) U.S. Cl.
CPC ............... *A62C 27/00* (2013.01); *A62C 33/04* (2013.01); *B60R 9/06* (2013.01)

(58) Field of Classification Search
USPC ......... 224/400, 401, 402, 519, 488, 512, 513, 224/524, 525, 42.32, 42.33; 182/113
See application file for complete search history.

(56) References Cited

U.S. PATENT DOCUMENTS

| | | | |
|---|---|---|---|
| 324,196 A | 8/1885 | Walling | |
| 1,583,772 A * | 5/1926 | Blaw | 248/77 |
| 2,394,447 A | 4/1943 | Hemp | |
| 2,492,914 A | 12/1949 | Barden | |
| 2,624,058 A | 1/1953 | Kudma | |
| 3,159,242 A | 12/1964 | James | |
| 3,580,613 A | 5/1971 | Northrop | |
| 3,603,539 A * | 9/1971 | Clegg, Jr. | 248/79 |
| 3,650,443 A | 3/1972 | Haskett | |
| 3,664,459 A * | 5/1972 | Stephens et al. | 182/141 |
| 3,762,499 A * | 10/1973 | Miller | 182/3 |
| 3,826,334 A | 7/1974 | Spillman | |
| 4,057,125 A | 11/1977 | Kroft | |
| 4,089,276 A | 5/1978 | Enos | |
| 4,185,716 A * | 1/1980 | Rinehart | 182/2.5 |
| 4,234,284 A | 11/1980 | Hauff | |
| 4,274,648 A | 6/1981 | Robins | |
| D278,944 S * | 5/1985 | Bresie et al. | D34/28 |
| 4,593,855 A * | 6/1986 | Forsyth | 239/74 |
| 4,869,520 A | 9/1989 | Cole | |
| 4,917,193 A * | 4/1990 | Ockler | 169/24 |
| 5,224,636 A | 7/1993 | Bounds | |
| 5,368,209 A | 11/1994 | Hill | |
| 5,533,774 A | 7/1996 | Cavanaugh | |
| 5,676,292 A | 10/1997 | Miller | |
| 5,775,560 A | 7/1998 | Zahn | |
| 6,006,973 A | 12/1999 | Belinky | |
| 6,099,061 A | 8/2000 | Gessay | |
| D432,488 S | 10/2000 | Roll | |
| 6,145,619 A * | 11/2000 | Risser | 182/113 |
| 6,502,730 B2 | 1/2003 | Johnson | |
| 6,598,704 B2 * | 7/2003 | Hansen | 182/113 |
| 6,685,421 B1 | 2/2004 | Reeves | |
| 6,712,248 B2 * | 3/2004 | Mitchell | 224/499 |
| 6,761,226 B2 * | 7/2004 | Carrier et al. | 169/24 |
| 6,761,248 B1 * | 7/2004 | Harbison | 182/127 |
| 6,783,315 B1 | 8/2004 | Senechal | |
| 6,802,441 B1 * | 10/2004 | DuRant et al. | 224/513 |
| 6,846,017 B2 | 1/2005 | Martin | |
| 6,874,804 B2 | 4/2005 | Reese | |
| D508,014 S | 8/2005 | Heravi | |

(Continued)

*Primary Examiner* — Justin Larson

(74) *Attorney, Agent, or Firm* — Miracle IP; Bryce D. Miracle

(57) ABSTRACT

A firefighting platform assembly that is attachable to the rear of existing fire vehicles outfitted with a self-contained firefighting apparatus or skid unit. The platform assembly comprises a platform base, upstanding side walls, and a means for attaching the platform assembly to a trailer hitch.

6 Claims, 10 Drawing Sheets

(56) References Cited

U.S. PATENT DOCUMENTS

| | | |
|---|---|---|
| 6,923,475 B1 * | 8/2005 | Martin et al. .................. 280/789 |
| 6,973,975 B1 * | 12/2005 | Adamson et al. ............... 169/24 |
| 6,994,362 B2 | 2/2006 | Foster |
| D518,269 S * | 3/2006 | Henshaw et al. ............. D34/38 |
| 7,195,262 B2 | 3/2007 | Chaudoin |
| 7,445,263 B1 | 11/2008 | Bluhm |
| 7,641,235 B1 * | 1/2010 | Anduss ......................... 280/769 |
| 7,836,963 B2 | 11/2010 | Collins |
| 7,909,112 B2 | 3/2011 | Decker |
| 8,281,969 B2 * | 10/2012 | Schmidlkofer ............... 224/543 |
| 8,505,684 B1 * | 8/2013 | Bogue ............................. 182/19 |
| 8,627,925 B2 * | 1/2014 | Webster ........................ 182/113 |
| 8,776,904 B2 * | 7/2014 | Groonwald ..................... 169/46 |
| 8,800,717 B2 * | 8/2014 | Berry et al. ................... 182/131 |
| 2002/0134620 A1 | 9/2002 | Meyer |
| 2009/0294139 A1 * | 12/2009 | Wilson ........................... 169/24 |
| 2010/0224663 A1 * | 9/2010 | Butler, III .................... 224/498 |
| 2011/0305552 A1 | 12/2011 | Pulliam |
| 2013/0200122 A1 * | 8/2013 | Elson, Gerald ............... 224/401 |
| 2013/0233645 A1 * | 9/2013 | Hao et al. ........................ 182/19 |

\* cited by examiner

TRUCK MOUNTED FIREFIGHTING PLATFORM ASSEMBLY

BACKGROUND

Firefighters fight fires to prevent loss of life and the destruction of property and the environment. Firefighting is a highly technical skill that requires professionals who have spent years in training in both general firefighting techniques and specialized areas of expertise.

A fire can rapidly spread and endanger many lives; however, with modern firefighting equipment and techniques, catastrophe can be avoided. Vehicles such as a fire engine or fire appliance are designed to assist in fighting fires by transporting firefighters to the scene and providing them with access to the fire, along with water and other equipment. Typically, water is pumped onto a fire by passing the water from a pump through hoses to the fire, from an array of valves.

There are numerous different types of fire fighting vehicles which are uniquely adapted to the array of differing environments that fires may occur, such as vehicles adapted to fight wild fires and bush fires. For example, wild land firefighting requires unique vehicles that can easily navigate difficult terrain and high-gradient roads, be self-reliant, and have high clearances for wheels and suspension. Wild land fire engines and wild land fire tenders may have lower capacities to carry water, but can be deployed to fight fires in environments where an urban fire apparatus would be unable to operate due to the terrain.

Moreover, complete self-contained firefighting apparatuses, commonly known as a skid unit, are designed for use on/in commercially available vehicle platforms. Vehicles such as pickup trucks, flatbed trucks, trailers, vans, off-road vehicles and others can easily be fitted with a proper size skid unit for a variety of firefighting operations. These skid units are effective in handling off-road grass fires, fairs, festivals, special events, rural construction areas, mining operations, dumpster and trash fires, car fires and many others. These skid units provide both stationary operation and the ability to pump water while the vehicle is moving. This contrasts with standard engines or pumpers, which use the vehicle's engine to power the pumps, meaning that the vehicle must be stationary while the pump is in operation.

Many problems are commonly encountered with fire vehicles that utilize skid units related to safety and the practical operation of the skid unit. Currently, in order for firefighters to effectively operate the hoses and fight fires they are required to either walk along and with the vehicle while the vehicle is in motion or sit on the truck bedrails, tailgate or even on top of the skid unit itself which is inherently dangerous. This increases the chances that a firefighter may fall off the fire vehicle or stumble and fall because of potential obstacles and uneven terrain as the vehicle moves about. Further, the firefighter is in an unfavorable position to access unit pump controls while utilizing the hoses. By enlarge, these problems reduce safety and increase exposure to the fire while limiting the firefighters ability to efficiently and effectively operate the unit controls and hoses while fighting fires.

The present invention provides an apparatus for reducing these problems. The difficulties inherent in the art are therefore overcome in a way which is simple and efficient, while providing better and more advantageous results.

SUMMARY

For the foregoing reasons, we have recognized that what is needed in order to solve the problems above is to provide a firefighting platform assembly that is easily attachable and detachable to the rear of existing fire vehicles outfitted with a self-contained firefighting apparatus.

The platform enables a firefighter to remain in a fixed, safe position behind the fire vehicle, whether at a stop or in motion, with immediate access to pump controls and hoses associated with the self-contained firefighting apparatus. Thereby, allowing the firefighter to efficiently and safely operate pump controls while addressing the fire from an advantageous position.

In a version of the invention, the platform assembly comprises a base and a plurality of upstanding walls located at the perimeter of the base. The walls comprise an inboard side wall and an outboard side wall and optional connecting sides there between. The inboard side wall comprises a gap that allows unrestricted and complete access to the rear of the fire vehicle outfitted with the self-contained firefighting apparatus. Moreover, the version further comprises a means for attaching the platform assembly to a vehicle trailer hitch.

Preferably, the means for attaching the platform assembly to a vehicle trailer hitch comprises a rigid hitch member that engages with a hitch receiver of a fire vehicle and optionally coupled with adjustable stabilizers that are adapted to fit different sized bumpers or platforms for added platform assembly support. The optional stabilizers may be affixed to the inboard side wall or to the platform base.

In a version, the outboard side or connecting sides may optionally comprise an opening or entrance to allow ingress and egress of the platform assembly while attached to the fire vehicle.

In another version of the invention, optional fire hose mounts are fixedly attached to the platform assembly which hold the fire hose nozzles in a fixed position when they are not being utilized. Also, angle mounts may be utilized to support hoses for unmanned operation.

The platform assembly can be made adaptable, replaceable or permanent to a plurality firefighting vehicles such as pickup trucks, flatbed trucks, trailers, vans, off-road vehicles and others can easily be fitted with a proper size skid unit for a variety of firefighting operations.

Still other benefits and advantages of the invention will become apparent to those skilled in the art to which it pertains upon a reading and understanding of the following detailed specification.

BRIEF DESCRIPTION OF THE DRAWINGS

These and other features, aspects, and advantages of the present invention will become better understood with regard to the following description, appended claims, and accompanying drawings where:

DESCRIPTION

Figure 1:
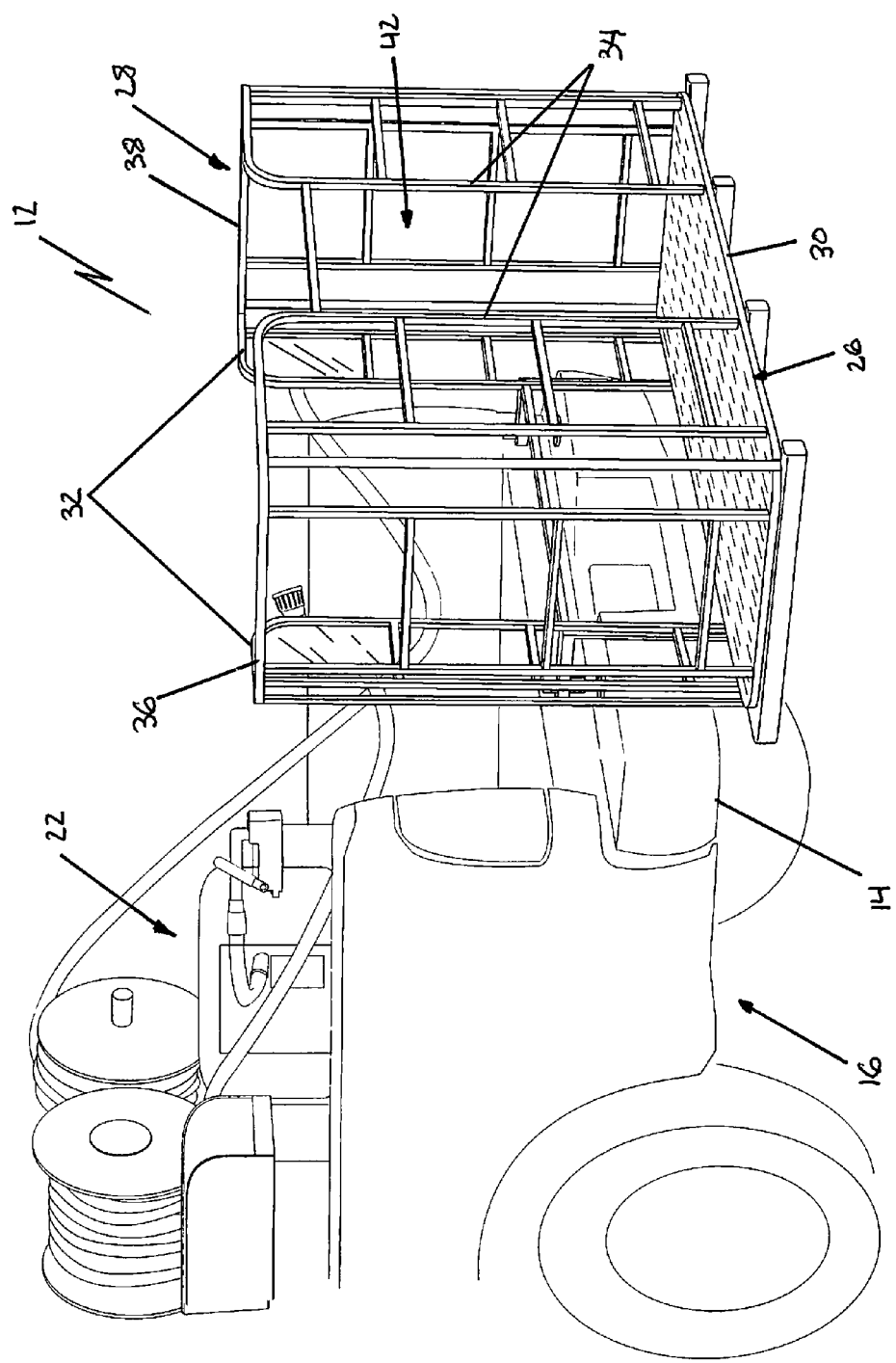
FIG. 1 is a perspective view of an exemplary use of a version of the present invention.

Referring now to the drawings wherein the showings are for purposes of illustrating a preferred version of the invention only and not for purposes of limiting the same.

The following detailed description is of the best currently contemplated modes of carrying out exemplary versions of the invention. The description is not to be taken in the limiting sense, but is made merely for the purpose of illustrating the general principles of the invention, since the scope of the invention is best defined by the appended claims.

Various inventive features are described below that can each be used independently of one another or in combination with other features.

Figure 2:
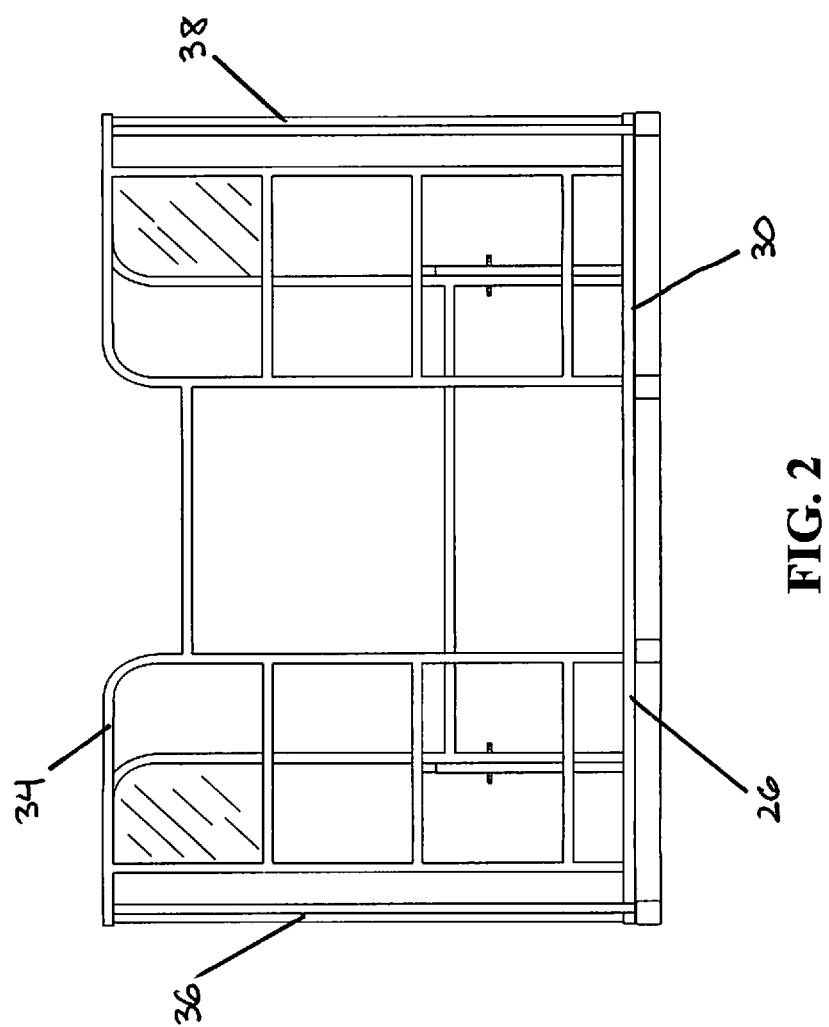
FIG. 2 is a front elevated view of the version shown in FIG. 1.

With reference to FIGS. 1 and 2, a version of a firefighting platform assembly 12 is shown attached as an example to the rear bumper 14 of a firefighting vehicle 16 that is outfitted with a self-contained firefighting apparatus 22 and a trailer hitch 18. The platform assembly 12 comprises a platform base 26 and a plurality of upstanding side walls generally depicted as 28 at the platform base perimeter 30. In this version, the plurality of upstanding side walls 28 comprise an inboard side wall generally depicted as 32 and outboard side wall 34 and connecting left side wall 36 and right side wall 38 there between. As illustrated by the version of FIG. 1, the plurality of upstanding side walls 28 of the platform assembly 12 are of a rigid frame construction and in other versions may be a cage or any other known structure that carries out the same purpose as a wall or barrier for securing an operator within.

Figure 3:
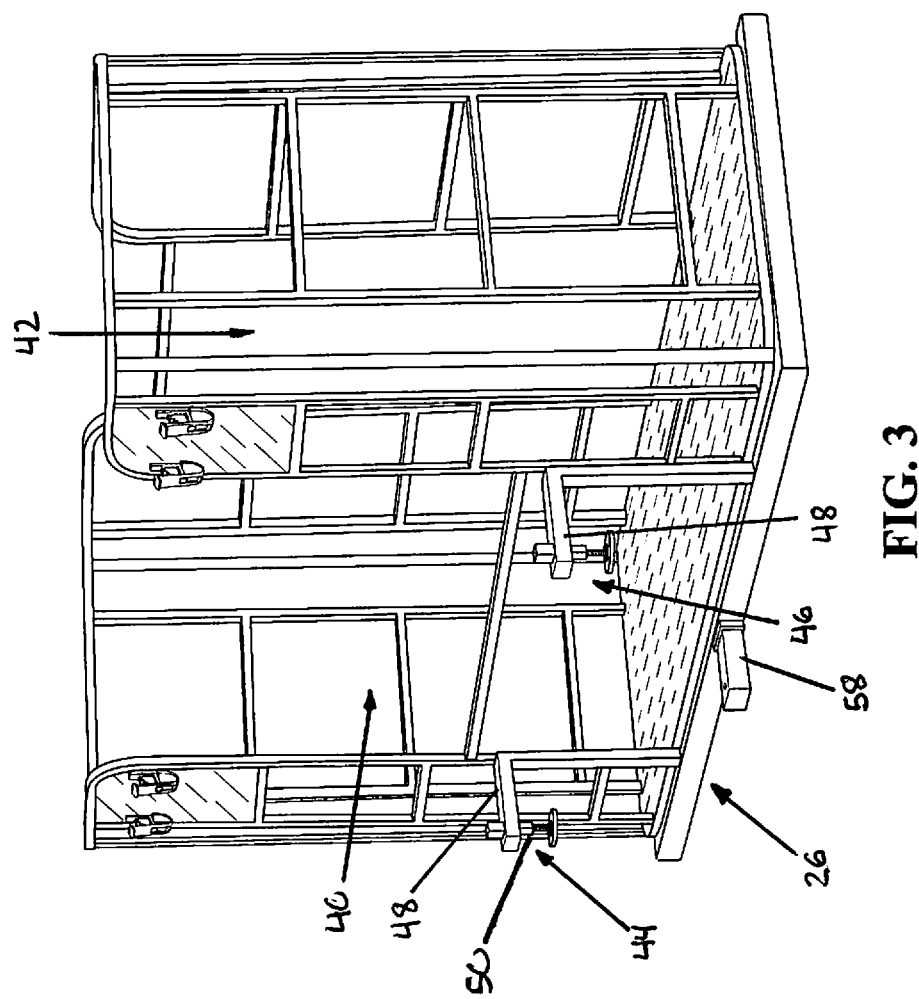
FIG. 3 is a rear perspective view of the version shown in FIG. 1.

Referring to FIGS. 1-3, inboard side wall 32 comprises a gap 40 that allows unrestricted and complete access to the rear of a fire vehicle outfitted with the self-contained firefighting apparatus 22. Further, outboard side wall 34 comprises an opening 42 or entrance that allows ingress and egress of the platform assembly while the platform assembly 12 is attached to the firefighting vehicle 16 and rear bumper 14.

Figure 4:
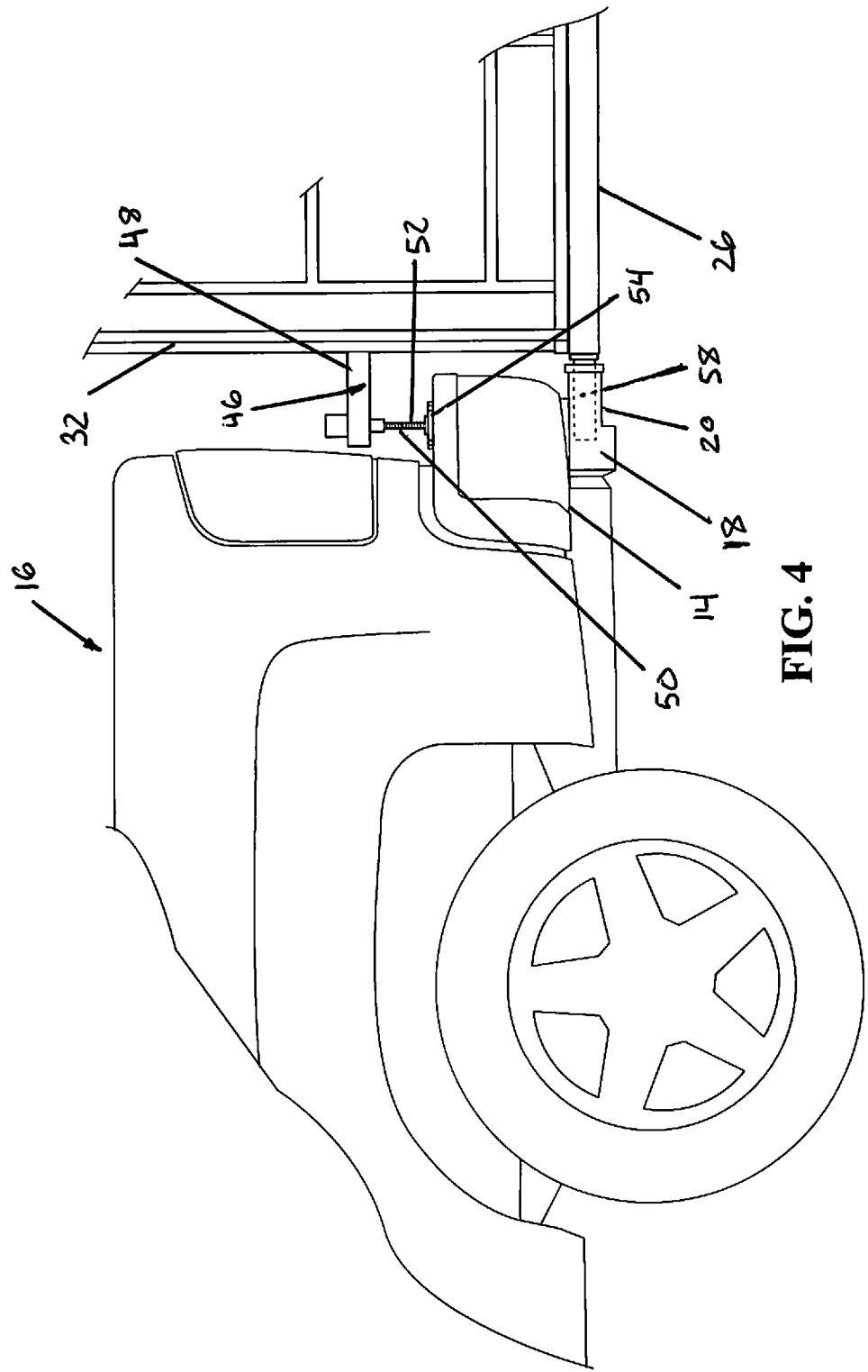
FIG. 4 is an illustrative left side elevation view of the version shown in FIG. 1.
Figure 5:
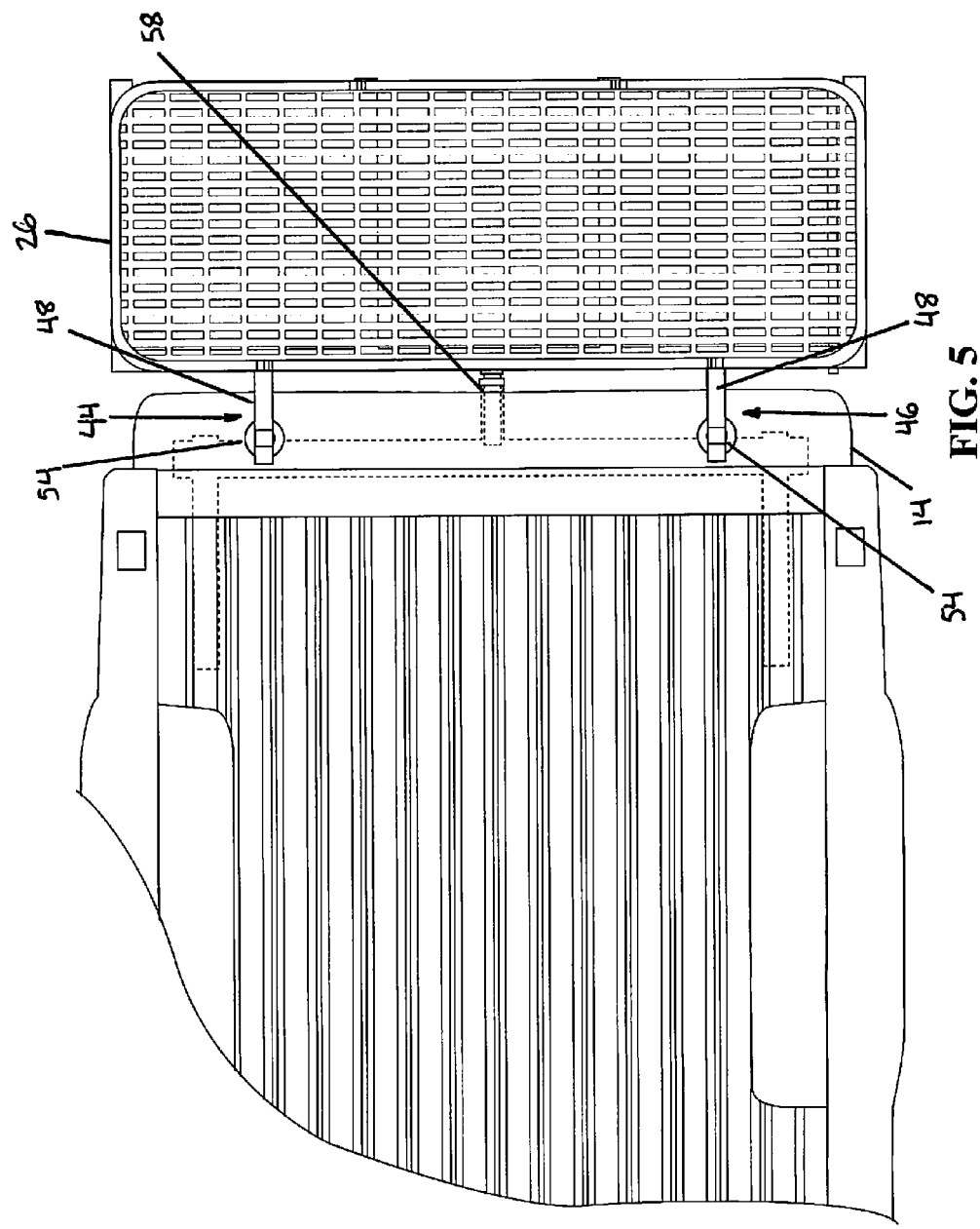
FIG. 5 is an illustrative top plan view of the version shown in FIG. 1.

Now referring to FIGS. 3-5, the platform assembly 12 comprises one or more stabilizer arms 44, 46 and a means for attaching the platform assembly to a trailer hitch which for purpose of this version is hitch member 58 which is described in detail below. The means for attaching can be any support member that connects to existing vehicle trailer hitches.

For purposes of the version, the trailer hitch 18 comprises a hitch receiver 20 and rear bumper 14 of the firefighting vehicle 16. The adjustable stabilizer arms are made with the ability to adjust and secure the platform assembly to a bumper or platform while coupled with the means for attaching platform assembly to a vehicle trailer hitch and can be made horizontally and vertically adjustable to custom fit different size trucks, truck bumpers and other platforms. For purposes of this version, the stabilizer arms 44 and 46 are fixedly attached to the outside of the inboard side wall 32 of the platform assembly 12, wherein they comprise a horizontal member 48 and a vertical leg member 50. The vertical leg member 50 includes an adjustment means or and elevating screw 52 and circular support base 54 that grips the surface of the rear bumper 14 or a platform. The hitch member 58 is rigidly affixed centrally to the platform base 26 and perpendicular to the inboard side wall 32. The hitch member 58 can be any size or shape in the art that is adaptable to be received from any size hitch receiver in the art as illustrated in FIGS. 4 and 5.

Figure 6:
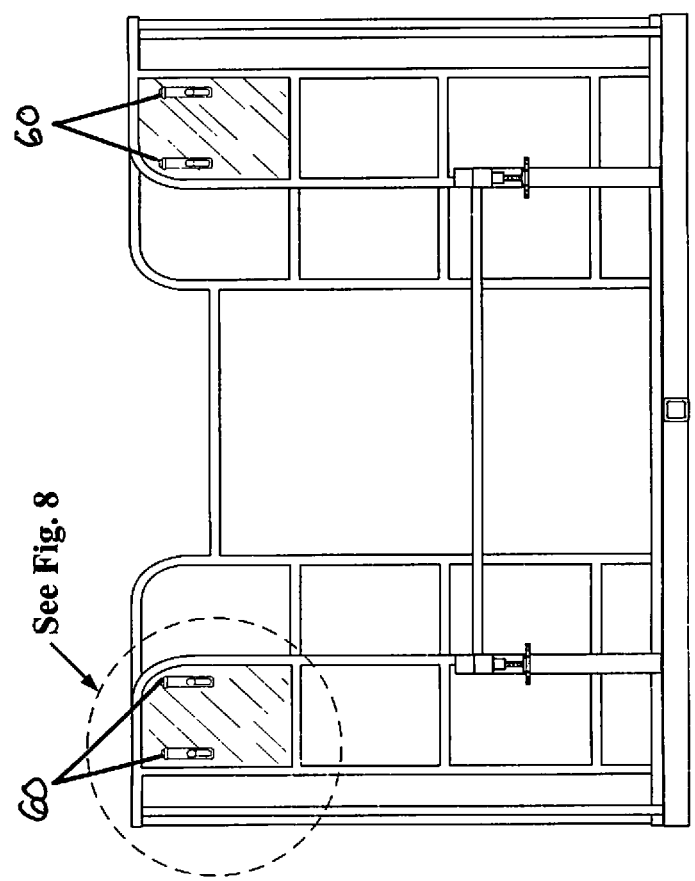
FIG. 6 is a rear elevation view of the version shown in FIG. 1.
Figure 7:
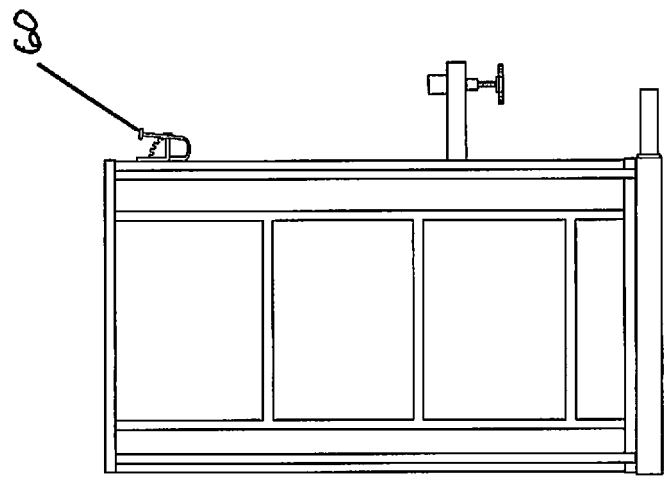
FIG. 7 is a right side elevation view of the version shown in FIG. 1.
Figure 8:
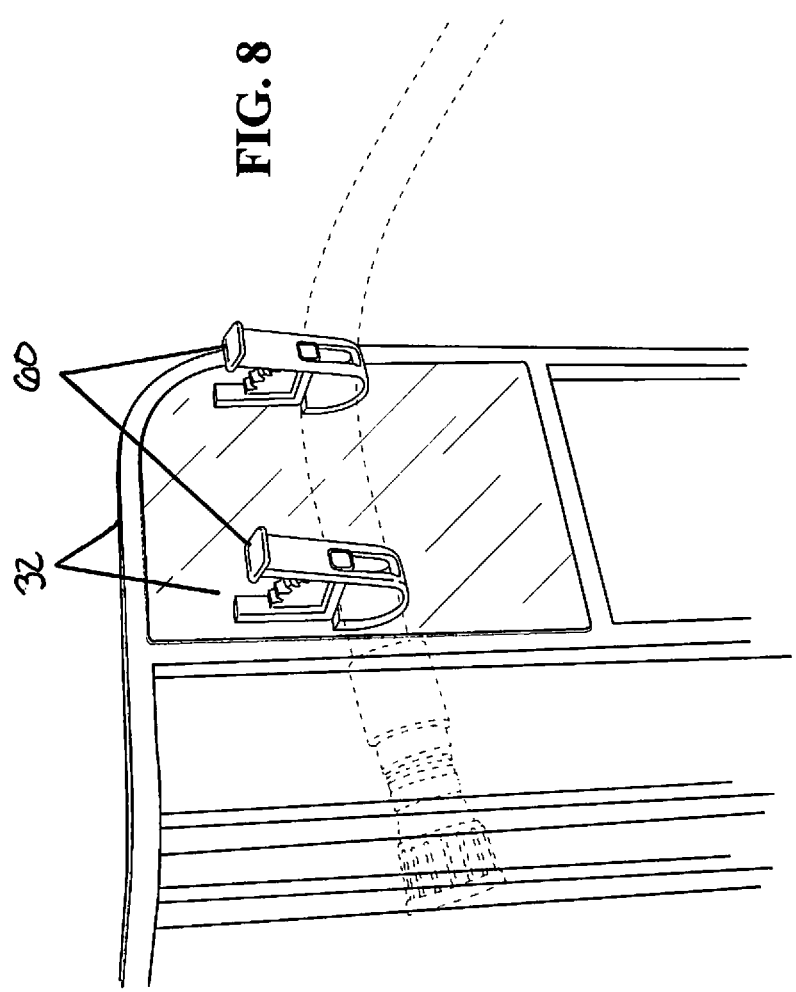
FIG. 8 is an up-close perspective view of the hose mounts of the version shown in FIG. 1.

Referring to FIGS. 6, 7 and 8, the platform assembly of FIG. 1 may further comprise one or more fire hose mounts 60. For purposes of this version, the one or more fire hose mounts are fixedly attached near the top right and left outer sides of the inboard side wall 32 as depicted in FIG. 8. The one or more hose mounts can be any means that will firmly embrace a fire hose near the nozzle end and may include a latch that is of the quick release type. It will be known that the one or more fire hose mounts 60 can be strategically placed in any position that is easily accessed and in close proximity to the rear of the fire vehicle. In addition, angle mounts may be added to the platform assembly for unmanned operation of the fire hoses. The angle mounts can be strategically placed in any position on the platform such that the hoses can effectively apply water to a fire without the support of a firefighter.

Figure 9:
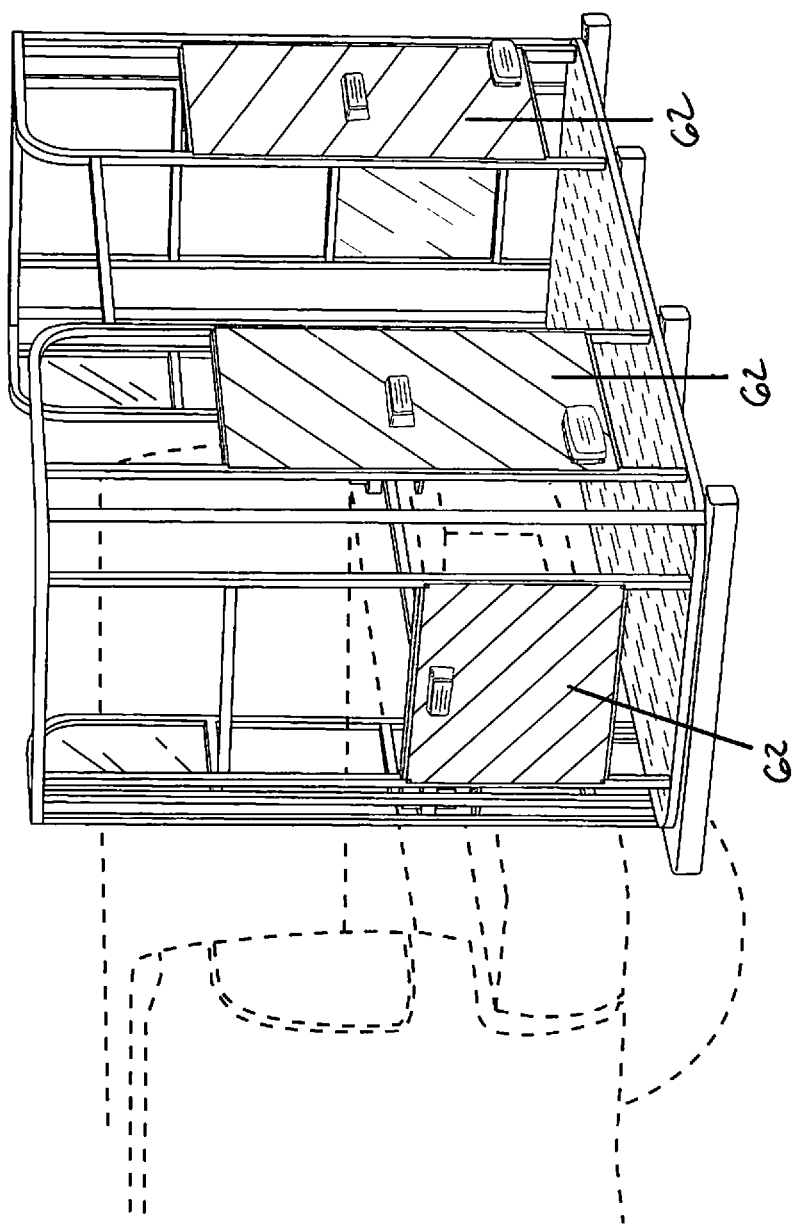
FIG. 9 is a front elevated perspective view of a version that includes safety reflector plates.
Figure 10:
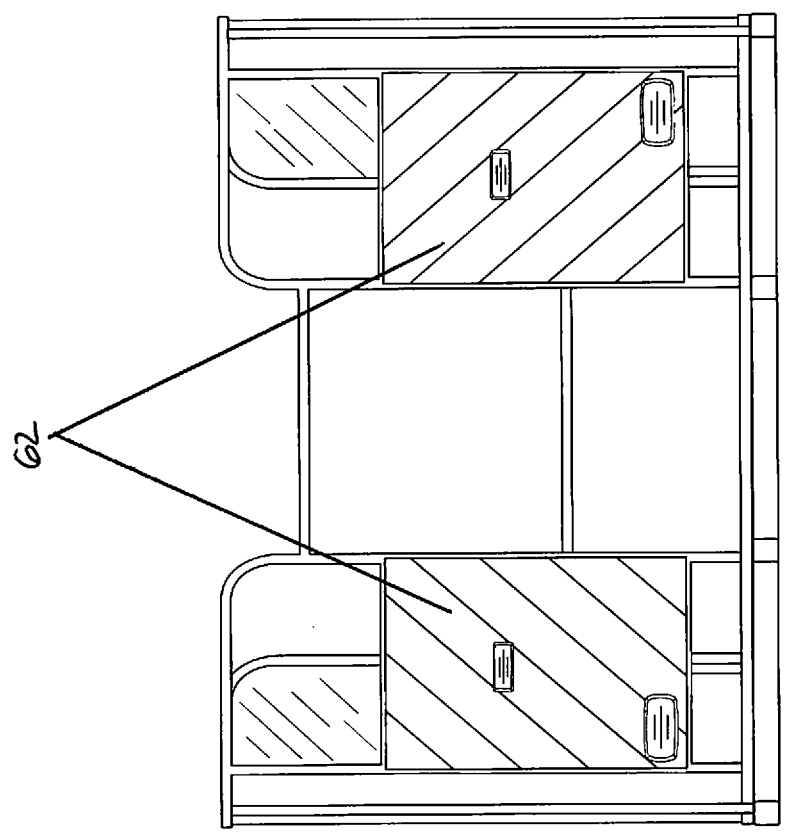
FIG. 10 is a front elevation view of the version shown in FIG. 9 that includes safety reflector plates.

Referring to FIGS. 9 and 10, another version of the invention may further comprise reflective panels 62 for added safety during transport. Ideally, the reflective panels are positioned and attached to the outboard side wall, connecting left and right side walls for maximum exposure and reflection of light.

Referring now to the figures, the application of the version of platform assembly 12 will be explained. FIG. 3 depicts the platform assembly 12 in the unhitched or unattached position. In this position, the platform assembly sits flat on the ground and thus can easily be stored anywhere with adequate space. FIGS. 1, 4 and 5 depict the version in the hitched or attached position to the rear of a firefighting vehicle 16 that comprises the rear bumper 14 and the hitch receiver 20. In order to be placed in this position, the platform assembly is lifted up in an even, level manner. Next, the hitch member 58 of the platform assembly is inserted into the hitch receiver 20 for a snug fit. While the hitch is inserted into the receiver, the stabilizer arms 44 and 46 are naturally placed over the rear bumper 14. The vertical leg member 50 is then adjusted vertically via the elevating screw 52 to securely seat the circular support base 54 onto the rear bumper 14. Thus, clamping and securing the platform assembly in a level manner onto the rear of the firefighting vehicle 16.

Once the platform assembly 12 is securely attached to the back of the firefighting vehicle 16, the platform assembly 12 is now mobile and ready to be transported to a nearby fire. As depicted in FIG. 1 and FIG. 8, fire hoses and nozzles can be secured to the platform assembly by the one or more fire hose mounts 60. Upon arriving at the scene of a fire such as a wild fire or grass fire, a firefighter is positioned inside and onto the platform assembly via the opening 42 of the outboard side wall 34. The firefighter is now in the optimal position to fight a fire from a safe, elevated and mobile position with the fire hose nozzles and controls of the self-contained firefighting apparatus in immediate proximity.

All of the versions of the present invention can be made permanent to a firefighting vehicle.

The present invention can be made in any manner and of any material chosen with sound engineering judgment such as steel. The materials may be strong, lightweight, long lasting, economic, and ergonomic.

The previously described versions of the present invention have many advantages, including providing a platform assembly with the ability to quickly and easily attach and detach from the rear of a fire vehicle and, more importantly, provide a firefighter with a safe, advantageous position to fight a fire while having unhindered access to the self-contained firefighting apparatus controls and hoses.

The invention does not require that all the advantageous features and all the advantages need to be incorporated into every version of the invention.

Although preferred versions of the invention have been described in considerable detail, other versions of the invention are possible.

All the features disclosed in this specification (including and accompanying claims, abstract, and drawings) may be replaced by alternative features serving the same, equivalent or similar purpose unless expressly stated otherwise. Thus, unless stated otherwise, each feature disclosed is one example only of a generic series of equivalent or similar features.

What is claimed is:

1. A platform assembly adaptable to a rear of a fire vehicle containing a hitch receiver and a self-contained firefighting apparatus, comprising:
   (a) a platform base comprising a platform base periphery;
   (b) a plurality of upstanding side walls located at the platform base periphery, the upstanding side walls comprise an inboard side wall oriented towards the vehicle and an outboard side wall opposite said inboard side wall, wherein the inboard side wall comprises an upwardly opening gap, wherein the upwardly opening gap has an adequate width for a user to move through from the platform base to the rear of the vehicle and allows unobstructed access to the rear of the fire vehicle containing a self-contained firefighting apparatus while standing on the platform base;
   (c) a hitch member rigidly attached near inboard side of said platform base for connection to a hitch receiver mounted on the rear of a fire vehicle;
   (d) one or more stabilizer arms fixedly attached to the inboard side wall to assist in supporting the platform assembly when adapted to the rear of a fire vehicle, wherein the one or more stabilizer arms are vertically adjustable to accommodate different size vehicle platforms and bumpers; and
   (e) one or more hose mounts fixedly attached near the upper, outer portion of the inboard side wall for securing one or more fire hose ends near the fire hose nozzle, adjacent to the self-contained firefighting apparatus.

2. The assembly platform of claim 1, wherein the outboard side wall comprises an opening for ingress and egress of platform assembly while the platform assembly is attached to the fire vehicle.

3. The platform assembly of claim 1, wherein the one or more hose mounts are configured to clamp hose ends near the nozzle in order to secure hose in place.

4. The platform assembly of claim 1, wherein the upstanding side walls further comprise one or more adjustable angle mounts that enable fire hose nozzles to be attached for unmanned usage, wherein the angle at which the nozzle is directed can be adjusted according to desired water trajectory and placement.

5. The platform assembly of claim 1, wherein the one or more stabilizer arms comprise a vertical leg member including an elevating screw and support base, the support base configured to grip the surface of the rear bumper of the fire vehicle and wherein the one or more stabilizer arms are vertically adjusted by the elevating screw.

6. A platform assembly adaptable to a rear of a fire vehicle containing a hitch receiver and a self-contained firefighting apparatus, comprising:
   (a) a platform base comprising a platform base periphery;
   (b) a plurality of upstanding side walls located at the platform base periphery, the upstanding side walls comprise an inboard side wall oriented towards the vehicle and an outboard side wall opposite said inboard side wall, wherein the inboard side wall comprises an upwardly opening gap, wherein the upwardly opening gap has an adequate width for a user to move through from the platform base to the rear of the vehicle and allows unobstructed access to the rear of the fire vehicle containing a self-contained firefighting apparatus while standing on the platform base, and wherein the outboard side wall comprises an opening for ingress and egress of platform assembly while the platform assembly is attached to the fire vehicle;
   (c) a hitch member rigidly attached near inboard side of said platform base for connection to a hitch receiver mounted on the rear of a fire vehicle;
   (d) one or more stabilizer arms fixedly attached to the inboard side wall to assist in supporting the platform assembly when adapted to the rear of a fire vehicle, wherein the one or more stabilizer arms are vertically adjustable to accommodate different size vehicle platforms and bumpers, wherein the one or more stabilizer arms comprise a vertical leg member including an elevating screw and support base, the support base configured to grip the surface of the rear bumper of the fire vehicle and wherein the one or more stabilizer arms are vertically adjusted by the elevating screw; and
   (e) one or more hose mounts fixedly attached near the upper, outer portion of the inboard side wall and are configured to clamp hose ends near the nozzle adjacent the self-contained firefighting apparatus.

* * * * *